US009680877B2

(12) United States Patent
Duffield et al.

(10) Patent No.: US 9,680,877 B2
(45) Date of Patent: *Jun. 13, 2017

(54) SYSTEMS AND METHODS FOR RULE-BASED ANOMALY DETECTION ON IP NETWORK FLOW

(71) Applicant: AT&T Intellectual Property I, L.P., Atlanta, GA (US)

(72) Inventors: Nicholas Duffield, Summit, NJ (US); Patrick Haffner, Atlantic Highland, NJ (US); Balachander Krishnamurthy, New York, NY (US); Haakon Andreas Ringberg, Ossining, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/969,591

(22) Filed: Dec. 15, 2015

(65) Prior Publication Data

US 2016/0105462 A1 Apr. 14, 2016

Related U.S. Application Data

(63) Continuation of application No. 12/568,044, filed on Sep. 28, 2009, now Pat. No. 9,258,217.

(Continued)

(51) Int. Cl.
*G06F 15/16* (2006.01)
*H04L 29/06* (2006.01)
(Continued)

(52) U.S. Cl.
CPC ............ *H04L 63/20* (2013.01); *G06F 21/552* (2013.01); *G06N 5/025* (2013.01);
(Continued)

(58) Field of Classification Search
CPC ... H04L 12/2613; H04L 12/242; H04L 41/16; H04L 41/06; H04L 43/16; H04L 45/28;
(Continued)

(56) References Cited

U.S. PATENT DOCUMENTS 7,002,974 B1 * 2/2006 Deerman ............ H04L 12/5693
370/229
7,356,585 B1 * 4/2008 Brook ................. H04L 63/1416
709/224

(Continued)

OTHER PUBLICATIONS

U.S. Office Action dated Jun. 11, 2012 in U.S. Appl. No. 12/568,044.

(Continued)

*Primary Examiner* — Tom Y Chang
(74) *Attorney, Agent, or Firm* — Hartman & Citrin LLC

(57) ABSTRACT

A system to detect anomalies in internet protocol (IP) flows uses a set of machine-learning (ML) rules that can be applied in real time at the IP flow level. A communication network has a large number of routers equipped with flow monitoring capability. A flow collector collects flow data from the routers throughout the communication network and provides them to a flow classifier. At the same time, a limited number of locations in the network monitor data packets and generate alerts based on packet data properties. The packet alerts and the flow data are provided to a machine learning system that detects correlations between the packet-based alerts and the flow data to thereby generate a series of flow-level alerts. These rules are provided to the flow time classifier. Over time, the new packet alerts and flow data are used to provide updated rules generated by the machine learning system.

3 Claims, 3 Drawing Sheets

Related U.S. Application Data

(60) Provisional application No. 61/122,814, filed on Dec. 16, 2008.

(51) Int. Cl.

| | | |
|---|---|---|
| *H04L 12/26* | (2006.01) | |
| *G06F 21/55* | (2013.01) | |
| *H04L 12/703* | (2013.01) | |
| *H04L 12/721* | (2013.01) | |
| *H04L 12/801* | (2013.01) | |
| *H04L 12/851* | (2013.01) | |
| *G06N 5/02* | (2006.01) | |
| *H04L 12/24* | (2006.01) | |

(52) U.S. Cl.
CPC .......... *H04L 12/2613* (2013.01); *H04L 41/16* (2013.01); *H04L 43/026* (2013.01); *H04L 45/28* (2013.01); *H04L 45/38* (2013.01); *H04L 47/10* (2013.01); *H04L 47/24* (2013.01); *H04L 63/1416* (2013.01); *H04L 63/1425* (2013.01); *H04L 12/242* (2013.01); *H04L 12/2615* (2013.01); *H04L 43/16* (2013.01); *H04L 63/14* (2013.01); *H04L 63/30* (2013.01)

(58) Field of Classification Search
CPC ......... H04L 47/10; H04L 47/14; H04L 63/14; H04L 63/30; H94L 12/2615
See application file for complete search history.

(56) References Cited

U.S. PATENT DOCUMENTS

| | | | | |
|---|---|---|---|---|
| 7,809,826 B1* | 10/2010 | Guruswamy | ......... | H04L 43/026 709/224 |
| 2003/0088529 A1* | 5/2003 | Klinker | ................... | H04L 45/00 706/3 |
| 2004/0103211 A1* | 5/2004 | Jackson | ............... | H04L 41/0893 709/244 |
| 2005/0135266 A1* | 6/2005 | Horng | ................. | H04L 12/2602 370/252 |
| 2005/0276230 A1* | 12/2005 | Akahane | ............. | H04L 12/2602 370/252 |
| 2006/0089985 A1* | 4/2006 | Poletto | ................ | H04L 41/0631 709/224 |
| 2006/0242694 A1* | 10/2006 | Gold | ................... | H04L 63/1441 726/13 |
| 2006/0272018 A1* | 11/2006 | Fouant | ................ | H04L 63/1416 726/23 |
| 2007/0006314 A1* | 1/2007 | Costa | ................... | G06F 21/554 726/25 |
| 2007/0143847 A1* | 6/2007 | Kraemer | ............... | G06F 21/554 726/23 |
| 2007/0179746 A1* | 8/2007 | Jiang | ..................... | G06F 11/008 702/185 |
| 2007/0188494 A1* | 8/2007 | Agutter | ............ | G06F 17/30554 345/440 |
| 2007/0192863 A1* | 8/2007 | Kapoor | ................... | G06F 9/505 726/23 |
| 2007/0289017 A1* | 12/2007 | Copeland | ............. | G06F 21/552 726/23 |
| 2008/0010225 A1* | 1/2008 | Gonsalves | ............. | G06N 7/005 706/11 |
| 2008/0022405 A1* | 1/2008 | Wang | .................. | H04L 63/1441 726/23 |
| 2008/0059301 A1* | 3/2008 | Granville | ............... | G06Q 30/02 705/14.6 |
| 2008/0086348 A1* | 4/2008 | Rao | ....................... | G06Q 10/063 705/7.11 |
| 2008/0086435 A1* | 4/2008 | Chesla | .................. | H04L 63/168 706/12 |
| 2008/0140912 A1* | 6/2008 | Pandya | ................... | G06F 9/444 711/101 |
| 2008/0229025 A1* | 9/2008 | Plamondon | ......... | G06F 12/0862 711/126 |
| 2008/0262991 A1* | 10/2008 | Kapoor | ................... | G06F 21/55 706/20 |
| 2008/0263661 A1* | 10/2008 | Bouzida | .............. | H04L 63/1416 726/22 |
| 2009/0003317 A1* | 1/2009 | Kasralikar | .......... | H04L 63/1408 370/352 |
| 2009/0154363 A1* | 6/2009 | Stephens | ............. | H04L 61/1517 370/241 |
| 2009/0168648 A1* | 7/2009 | Labovitz | ............. | H04L 12/2602 370/229 |
| 2009/0207741 A1* | 8/2009 | Takahashi | ............... | H04L 41/12 370/242 |
| 2009/0310491 A1* | 12/2009 | Ginsberg | ............ | H04L 12/2697 370/241 |
| 2009/0328185 A1* | 12/2009 | Berg | ................... | H04L 63/0245 726/13 |
| 2010/0034102 A1* | 2/2010 | Wang | .................. | H04L 43/0876 370/252 |
| 2010/0070647 A1* | 3/2010 | Irino | ...................... | H04L 47/10 709/234 |
| 2010/0284283 A1 | 11/2010 | Golic et al. | | |
| 2011/0019574 A1* | 1/2011 | Malomsoky | ........ | H04L 41/5022 370/252 |
| 2011/0185418 A1* | 7/2011 | Boteler | ............... | H04L 63/1416 726/22 |
| 2011/0238855 A1* | 9/2011 | Korsunsky | ............. | G06F 21/55 709/231 |
| 2011/0258702 A1* | 10/2011 | Olney | ................... | G06F 21/564 726/24 |
| 2012/0284791 A1* | 11/2012 | Miller | ................... | G06F 21/554 726/22 |
| 2013/0227689 A1* | 8/2013 | Pietrowicz | ............... | G01R 1/20 726/23 |
| 2013/0305357 A1* | 11/2013 | Ayyagari | ................ | H04L 63/14 726/22 |

OTHER PUBLICATIONS

U.S. Office Action dated Oct. 19, 2012 in U.S. Appl. No. 12/568,044.
U.S. Office Action dated Oct. 8, 2014 in U.S. Appl. No. 12/568,044.
U.S. Office Action dated Feb. 19, 2015 in U.S. Appl. No. 12/568,044.
U.S. Notice of Allowance dated Sep. 16, 2015 in U.S. Appl. No. 12/568,044.

\* cited by examiner

SYSTEMS AND METHODS FOR RULE-BASED ANOMALY DETECTION ON IP NETWORK FLOW

CROSS-REFERENCE TO RELATED APPLICATIONS

This application is a continuation of U.S. patent application Ser. No. 12/568,044, entitled "Systems and Methods for Rule-Based Anomaly Detection on IP Network Flow," filed Sep. 28, 2009, now U.S. Pat. No. 9,258,217, which claims priority to U.S. Provisional Patent Application No. 61/122,814, entitled "Rule-Based Anomaly Detection on IP Flows," filed Dec. 16, 2008, now expired, which are both incorporated herein by reference in their respective entireties.

BACKGROUND

Field of the Disclosure

The present disclosure is directed generally to network flow and, more particularly, to a system and method for rule-based anomaly detection on IP network flow.

Description of the Related Art

Detecting unwanted traffic is a crucial task in managing data communications networks. Detecting network attack traffic, and non-attack traffic that violates network policy, are two key applications. Many types of unwanted traffic can be identified by rules that match known signatures. Rules may match on a packet's header, payload, or both. The 2003 Slammer Worm, described in D. Moore, V. Paxson, S. Savage, C. Shannon, S. Staniford, and N. Weaver, "Inside the slammer worm," *IEEE Security and Privacy*, vol. 1, no. 4, pp. 33-39, 2003 exploited a buffer overflow vulnerability in the Microsoft SQL server, was matchable to a signature comprising both packet header fields and payload patterns.

Packet inspection can be carried out directly in routers, or in ancillary devices observing network traffic, (e.g., on an interface attached to the network through a passive optical splitter). Special purpose devices of this type are available from vendors, often equipped with proprietary software and rules. Alternative software systems such as Snort available at http://www.snort.org can run on a general purpose computer, with a language for specifying rules created by the user or borrowed from a community source.

In any of the above models, a major challenge for comprehensive deployment over a large network, such as a Tier-1 ISP, is the combination of network scale and high capacity network links. Packet inspection at the network edge involves deploying monitoring capability at a large number of network interfaces (access speeds from OC-3 to OC-48 are common). Monitoring in the network core is challenging since traffic is concentrated through higher speed interfaces (OC-768 links are increasingly being deployed). Wherever the traffic is monitored, many hundreds of rules may need to be operated concurrently. Whereas fixed-offset matching is cheap computationally and has known costs, execution of more complex queries may hit computational bandwidth constraints. Even when inspection is operated as a router feature, there may be large licensing costs associated with its widespread deployment.

BRIEF DESCRIPTION OF THE SEVERAL VIEWS OF THE DRAWING(S)

DETAILED DESCRIPTION

Introduction

Figure 1:
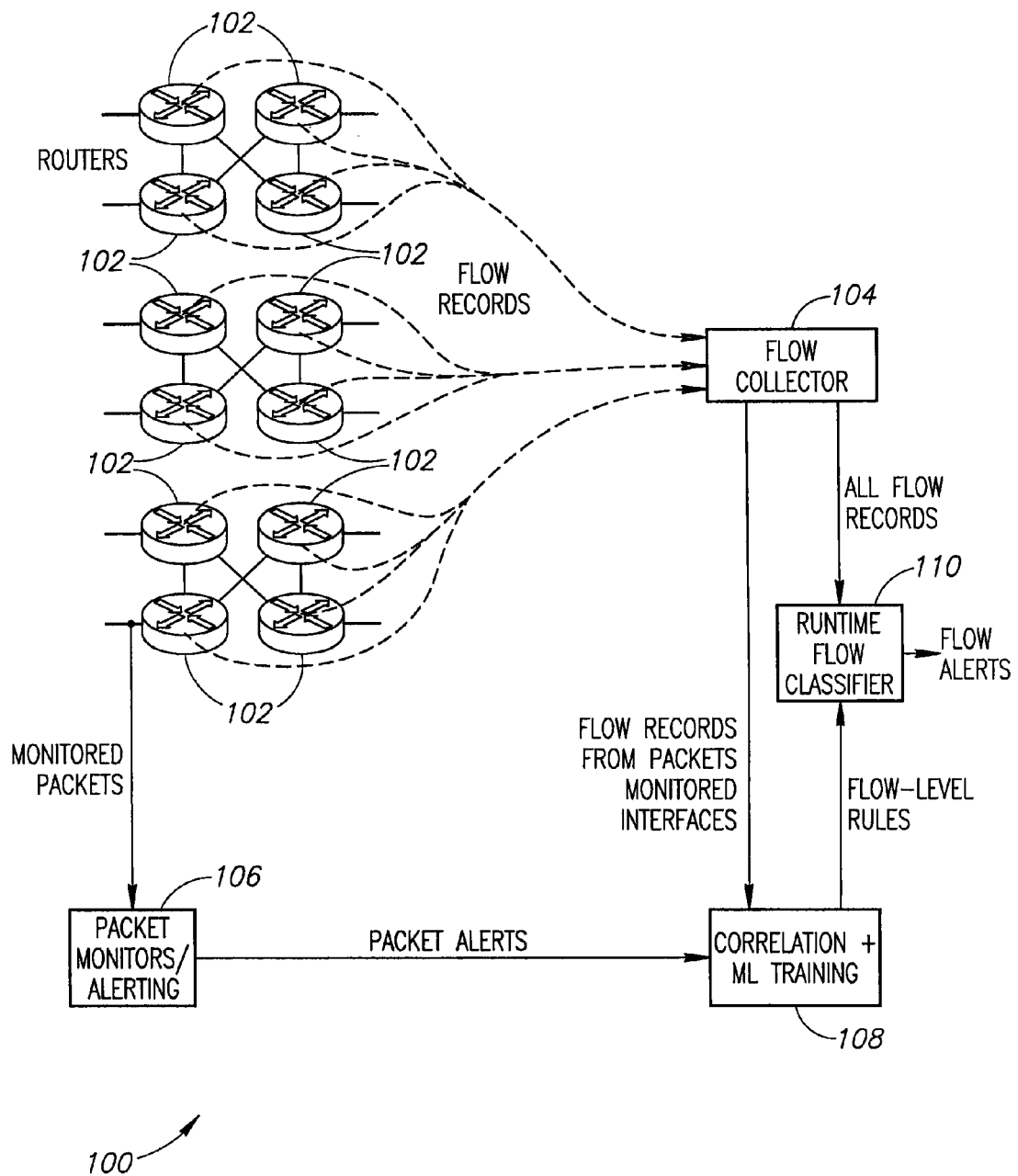
FIG. 1 illustrates an exemplary system architecture constructed in accordance with the present teachings.

An intrusion detection system (IDS) that could inspect every network packet would be ideal, but is impractical. Signature based detection systems such as Snort have been widely deployed by enterprises for network security, but are limited by the scaling factors described above. A network architecture, shown in FIG. 1, can translate many existing packet signatures to instead operate effectively on IP flows. Flow Records are collected from a set of router interfaces 102 across the network topology (edge and/or core) so that all traffic traverses at least one router interface 102 at which flow records are generated. The flow records are exported to a flow collector 104.

In addition to flow monitoring, a small number of packet monitors 106 are located at router interfaces 102 chosen so as to see a representative mix of traffic. Each packet monitor 106 is equipped with a set of packet level rules, which are applied to the observed packet stream. Alerts produced by the packet rules are forwarded to a machine learning (ML) trainer 108.

The ML trainer 108 also receives flow records from the flow collector 104 and correlates packet alerts with flows generated from the same traffic, and generates the set of flow level alerting rules. The rules are updated periodically, or in response to observed changes in traffic characteristics.

A runtime flow classifier 110 applies flow-level rules to all flow records, producing real-time or near real-time flow-level alerts.

Flow statistics are compact and collected ubiquitously within most ISPs' networks, often in the form of NetFlow, which is described in "Cisco netflow. http://www.cisco.cotn/warp/public/732/netflow/." The techniques described herein do not supplant signature-based detection systems, but rather extend their usefulness into new environments where packet inspection is either infeasible or undesirable.

As described in greater detail below, the techniques described herein are used to construct rules at the flow level that accurately reproduce the action of packet-level rules. In other words, an alarm should ideally be raised for flows that are derived from packets that would trigger packet-level rules. The methods described herein are probabilistic in that the flow level rules do not reproduce packet level rules with complete accuracy; this is the trade-off for scalability. The idea of deriving flow-level rules from the header portion of a packet-level rule has been proposed by H. Madhyastha and B. Krishnamurthy, "A generic language for application-specific flow sampling," *Computer Communication Review*, April 2008, but this technique only applies to rules that exclusively inspect a packet's header. What can be done for rules that contain predicates that match on a packet's payload? Ignoring the rule or removing the predicates are both unsatisfactory options, as they can lead to degraded detection performance in general.

Signatures that inspect a packet's payload can still be effectively learned if there is a strong association between features of the flow header produced by this packet and the packet's payload. For example, the Slammer Worm infects new host computers by exploiting a buffer overflow bug in Microsoft's SQL server; these attack packets contain known payload signatures in addition to targeting a specific UDP port on the victim host. The Snort signature to detect these packets utilizes both these pieces of information to improve detection. An exhaustive system for translating packet rules into flow rules must leverage these correlations between the packet payload and flow header in order to mitigate the impact of losing payload information.

Some signatures exhibit a strong association between payload and flow-header information even though no correlation is implied in the original packet signature. This can occur either because the human author of the signature was unaware of or disregarded this piece of information (e.g., the unwanted traffic very frequently uses a particular destination port, even though this was not specified in the packet signature), or because the association exists between the payload and flow-header features that have no packet-header counterpart (e.g., flow duration). For this reason, our architecture leverages Machine Learning (ML) algorithms in order to discover the flow-level classifier that most successfully approximates a packet signature. The essential advantage of ML algorithms is their ability to learn to characterize flows according to predicates that were not included in the original packet-level signature.

The techniques described herein include the presentation of an ML-based architecture that can detect unwanted traffic using flow signatures. These flow signatures are learned from a reference set of packet signatures and joint packet/flow data. The system 100 described herein has been evaluated on traces from and signatures used by a medium-sized enterprise. The results show that ML algorithms can effectively learn many packet signatures including some that inspect the packet payload. It is also demonstrated that the system 100 (see FIG. 1) is computationally feasible in that it: (1) can relearn the packet signatures well within the timescales required by inherent data drift, and (2) the learned classifiers can operate at very high speeds. This is demonstrated both analytically and empirically.

The results presented herein are analyzed with an emphasis on understanding why some signatures can be effectively learned whereas others cannot. To this end, a discussion of taxonomy of packet signatures that a priori separates them into sets (A) that the system 100 will be able to learn perfectly, (B) that the system 100 is likely to learn very well, or (C) where the accuracy of the trained classifier 110 in the system 100 varies based on the nature of the signature. For signatures that fall into classes (B) or (C), where there is a priori uncertainty regarding how well the system 100 will perform, it is possible to detail the properties of the signatures that are successfully learned using examples from the set of described signatures.

The rest of this discussion is organized as follows. There is a discussion of related work. A taxonomy of packet signatures is presented and relevant aspects of how signature-based detection systems are used in practice, including some specifics on Snort rules and of flow level features that employed herein are presented. The operation of ML algorithms, and an algorithm that determined to be effective, namely, Adaboost, is reviewed in the dataset and experiment setup, and performance evaluation methodology is presented, including detection accuracy metrics used for evaluation. A discussion of experimental evaluation results are presented, in addition to further analysis of the signatures whose detection performance the a priori taxonomy cannot predict. The computational efficiency of the system 100, both in terms of learning and classifying flows according to given packet-level signatures, is discussed before conclusions are presented.

Related Work

There is an extensive recent literature on automating the detection of unwanted traffic in communications networks, most importantly, detection of email spam, denial of service attacks and other network intrusions. Anomaly detection has been used to flag deviations from baseline behavior of network traffic learned through various unsupervised methods, including clustering, Bayesian networks, PCA analysis and spectral methods; see, e.g., A. Lakhina, M. Crovella, and C. Diot, "Mining anomalies using traffic feature distributions," in SIGCOMM '05, 2005, pp. 217-228; T. Shon and J. Moon, "A hybrid machine learning approach to network anomaly detection," Inf. Sci., vol. 177, no. 18, pp. 3799-3821, 2007; T. Ahmed, B. Oreshkin, and M. J. Coates, "Machine learning approaches to network anomaly detection," in Proc. SysML, 2007; A. Soule, K. Salamatian, and N. Taft, "Combining filtering and statistical methods for anomaly detection," in IMC '05. New York, N.Y., USA: ACM, 2005, pp. 1-14; Y. Zhang, Z. Ge, A. Greenberg, and M. Roughan, "Network anomography," in IMC '05. New York, N.Y., USA: ACM, 2005, pp. 1-14; Barford, J. Kline, D. Plonka, and A. Ron, "A signal analysis of network traffic anomalies," in Internet Measurement Workshop, 2002. The approach taken in the system 100 is different to these: rather than alarming unknown unusual events based on deviation from observed norms, the set of events alerted by packet rules is treated as representing the most complete available knowledge. The function of ML is to determine how best to reproduce the alerts at the flow level.

ML techniques have been used for traffic application classification. Approaches include unsupervised learning of application classes via clustering of flow features and derivation of heuristics for packet-based identification C. Kruegel, D. Mutz, W. Robertson, and F. Valeur, "Bayesian event classification for intrusion detection," in *ACSAC '03: Proceedings of the 19th Annual Computer Security Applications Conference*. Washington, D.C., USA: IEEE Computer Society, 2003, p. 14.; semi-supervised learning from marked flow data L. Bernaille, R. Teixeira, and K. Salamatian, "Early application identification," in *Conference on Future Networking Technologies*, 2006 and supervised learning from flow features, J. Erman, A. Mahanti, M. F. Arlitt, I. Cohen, and C. L. Williamson, "Offline/realtime traffic classification using semi-supervised learning," Perform. Eval., vol. 64, no. 9-12, pp. 1194-1213, 2007; A. Moore and D. Zuev, "Internet traffic classification using bayesian analysis," in *Sigmetrics*, 2005.

A Packet Signature Taxonomy

The following model and classification for packet rules is adopted for the discussion of the system 100. A packet rule is specified by a set of predicates that are combined through logical AND and OR operations. Three types of predicate are classified in tables described below: flow-header (FH), packet payload (PP), and meta-information (MI) predicates.

FH predicates involve only packet fields that are reported exactly in any flow record consistent with the packet key. This includes source and destination IP addresses and UDP/TCP ports, but excludes packet header fields such as IP identification (not reported in a flow record) and packet length (only reported exactly in single packet flows).

PP predicates involve the packet payload (i.e., excluding network and transport layer headers present). MI predicates involve only packet header information that is reported either inexactly or not at all in the flow record (e.g., the IP ID field).

Figure 2:
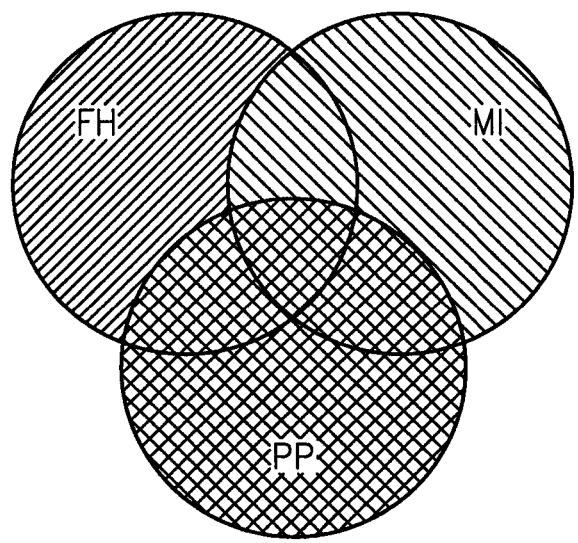
FIG. 2 is a diagram illustrating various packet rule classifications, including flow header (FH), packet payload (PP), and meta-information (MI) classifications that indicate rule attributes according to predicate classes where disjoint packet rule classifications are illustrated by different patterns.

From the above discussion, packet length is MI, as are TCP flags, because being cumulative over flows of packets, they are reported exactly only for single-packet flows. Packet rules may contain multiple predicates, each of which may have different types of (FH, PP, MI) associated with it. For the present discussion, a single type is assigned to the rule itself based on the types of predicates from which it is composed. In the study described herein, the set of possible packet rules were partitioned into disjoint classes based on the types of predicates present. FIG. 2 illustrates the packet rule classification where FH, PP, and MI indicate rule attributes according to different predicate classes with the disjoint packet rule classification illustrated by different patterns. The classification works well with the performance of the ML method described herein, in the sense that rule class is a qualitative predictor of accuracy of learned flow-level classifiers. In an exemplary embodiment of the present study, the packet rule classification is as follows:

Header-Only Rules: comprise only FH predicates.

Payload-Dependent Rules: include at least one PP predicate.

Meta-Information Rules: include no PP predicates, do include MI predicates, and may include FH predicates.

The relationship between the classification of packet rules and the classification of the underlying predicates is illustrated in FIG. 2; each circle illustrates the set of rules with attributes corresponding to the predicate classification FH, PP, and MI. The packet rule classification is indicated by different patterns.

Packet and Flow Rules in Practice

Snort, http://www.snort.org, is an open-source intrusion detection system (IDS) that monitors networks by matching each packet it observes against a set of rules. Snort can perform real-time traffic and protocol analysis to help detect various attacks and alert users in real time. Snort employs a pattern matching model for detecting network attack packets using identifiers such as IP addresses, TCP/UDP port numbers, ICMP type/code, and strings obtained in the packet payload. Snort's rules are classified into priority classes, based on a global notion of the potential impact of alerts that match each rule. Each Snort rule is documented along with the potential for false positives and negatives, together with corrective measures to be taken when an alert is raised. The simplicity of Snort's rules has made it a popular IDS. Users contribute rules when new types of anomalous or malicious traffic are observed. A Snort rule is a boolean formula composed of predicates that check for specific values of various fields present in the IP header, transport header, and payload.

The flow-level rules in the system 100 were constructed from the following features of flow records: source port, destination port, #packets, #bytes, duration, mean packet size, mean packet interarrival time, TCP flags, protocol, ToS, "source IP address is part of Snort home net", "destination IP address is part of Snort home net", "source IP address is an AIM server", "destination IP address is an AIM server". The Snort home net is commonly configured to whatever local domain the operator desires to protect from attacks originating externally.

Flow level predicates are constructed in the following ways:

(1) For categorical features like protocol or TCP flags, the ML trainer 108 uses as many binary predicates as there are categories. For example, if the protocol feature could only take on the values {ICMP, UDP, TCP} then an ICMP packet would be encoded as the predicate ICMP=1, UDP=0, and TCP=0.

(2) For numerical features such as #packets, it is desirable to finely threshold them, so that a rule with a predicate specifying (e.g., an exact number of packets) can be properly detected by the flow classifier 110. The predicates in the system 100 take the form "feature>threshold".

The system 100 described herein seeks to leverage ML algorithms in order to raise Snort-type alerts on flow records. To train the ML algorithms in the trainer 108 the system 100 requires concurrent flow and packet traces so that the alerts that Snort raises on packets can be associated with the corresponding flow record. "Correspondence" here means that the packets and flow originate from the same underlying connection. In other words, if Snort has raised an alert on a packet at time t then the flow classifier 110 detects the flow with the same IP 5-tuple, start time $t_s$, and end time $t_e$ such that $t_s \leq t \leq t_e$. The flow classifier 110 then associates the packet alert with the flow. A single packet may raise multiple Snort alerts, and a single flow will often correspond to a sequence of packets, which means that individual flows can be associated with many Snort alerts.

Machine Learning Algorithms

Formally the task addressed by the system 100 is as follows. For each Snort rule the training data takes the form of a pair $(x_i, y_i)$ where flow i has flow features $x_i$, and $y_i \in \{-1, 1\}$ indicates whether flow i triggered this Snort rule. The goal of the system 100 is for the ML trainer 108 to attribute to each Snort rule a score in the form of a weighted sum $\Sigma_k w_k p_k(x)$ over the flow level predicates $p_k(x)$ described in Section IV. When this score exceeds an operating threshold $\mu$, the flowtime classifier 110 has an ML Alarm. Since ML alarms should closely mimic the original Snort alarms $y_i$, the weights $w_k$ are chosen to minimize the classification error $\Sigma_i I(y_i \neq \text{sign}(\Sigma_k w_k p_k(x) - \theta))$. However, deployment considerations will determine the best operating threshold for a given operating point.

Supervised linear classifiers such as Support Vector Machines (SVMs) V. N. Vapnik, Statistical Learning Theory. John Wiley & Sons, 1998, Adaboost R. E. Schapire and Y. Singer, "Improved boosting algorithms using confidence-rated predictions," *Machine Learning*, vol. 37, no. 3, pp. 297-336, 1999 and Maximum Entropy M. Dudik, S. Phillips, and R. E. Schapire, "Performance Guarantees for Regularized Maximum Entropy Density Estimation," in *Proceedings of COLT'04*. Banff, Canada: Springer Verlag, 2004 have been successfully applied to many such problems and may be used to implement the flow classifier 110. There are two primary reasons for this. First, the convex optimization problem is guaranteed to converge and optimization algorithms based either on coordinate or gradient descent can learn millions of examples in minutes (down from weeks ten years ago). Second, these algorithms are regularized and seldom overfit the training data. This is what a fully automated training process for the ML trainer 108 in the system 100 requires: scalable algorithms that are guaranteed to converge with predictable performance.

Preliminary experiments established that, on average, Adaboost accuracy was significantly better than SVMs. It is, therefore, convenient to highlight the properties of Adaboost that make it well-suited for the present application. A linear algorithm like Adaboost works well here because the actual number of features is large. In theory, each numerical feature (e.g., source port or duration) may generate as many flow level predicates of the form "feature>threshold" as there are training examples for use in the ML trainer 108. In practice, this potentially large set of predicates does not need to be explicitly represented. Adaboost has an incremental greedy training procedure that only adds predicates needed for finer discrimination R. E. Schapire and Y. Singer, "Improved boosting algorithms using confidence-rated predictions," *Machine Learning*, vol. 37, no. 3, pp. 297-336, 1999.

Good generalization is achieved if the flow classifier 110 represents the "simplest" linear combination of flow-level predicates. Adaboost uses an $L_1$ measure of simplicity that encourages sparsity, a property that is well matched to the aim of finding a small number of predicates that are closely related to the packet level rules. This contrasts with the more relaxed $L_2$ measure used by SVM's, which typically produces a more complex implementation of the flow classifier 110. Finally, while Adaboost is known for poor behavior on noisy data, the low level of noise in the data encountered by the system 100 makes the learning conditions ideal. In preliminary experiments, similar behavior is observed with $L_1$-regularized Maximum Entropy, described in M. Dudik, S. Phillips, and R. E. Schapire, "Performance Guarantees for Regularized Maximum Entropy Density Estimation," in Proceedings of COLT'04. Banff, Canada: Springer Verlag, 2004, an algorithm that is much more robust to noise.

Data Description and Evaluation Setup

To demonstrate proof-of-concept, a test evaluation setup (not shown) was established. Data was gathered at a gateway serving hundreds of users during a two-month period. All traffic traversing an OC-3 link attached to a border router was examined. Data was gathered via an optical splitter to prevent problems with normal network operations. A standard Linux box performed the role of a monitor reading packets via a DAG card. Simultaneously, unsampled netflow records were also collected from the router. Snort rules in place at the site were used for the evaluation. The traffic represented 5 Terabytes distributed over 1 Billion flows over 29 days (i.e., an average rate of about 2 MBytes/second). The average number of packets per flow was 14.5, and 55% of flows comprised 1 packet.

The data was divided into 4 weeks. Week 1 is used for training only, week 2 for both training and testing and weeks 3-4 for testing only. Table I below reports the number of flows each week.

TABLE 1

| | Number of Flows in Millions Per Week | | | |
|---|---|---|---|---|
| Flow Type | Wk 1 | Wk 2 | Wk 3 | Wk 4 |
| Neg: no alerts | 202.9 | 221.8 | 235.9 | 251.6 |
| Unique neg. | 41.8 | 48.3 | 42.7 | 48.7 |
| Pos: some alert | 6.7 | 7.2 | 6.5 | 6.9 |
| Unique pos. | 0.1 | 0.1 | 0.1 | 0.1 |

The 200-250 million examples collected each week would represent a major challenge to current training algorithms. Fortunately, the number of unique examples is usually 40-50 million per week, and of these only about 100,000 contain an alert. These can train optimized implementations of Adaboost or SVMs in a span of hours. Removing purely deterministic features greatly simplifies the training problem by reducing the number of examples; it also slightly improves performance. The two main deterministic features are:

Source IP is Part of Local Network:

Snort rules usually assume that alerts can only be caused by external flows, which means that they require this feature to be 0. After computing unique flow statistics, there were 54 million local and 167 million external flows that are not alerts, zero local and 7 million external flows that are alerts. Making a boolean decision that all local flows are safe, prior to running the classifier, reduces the training data by 54 million examples.

Protocol:

Snort rules only apply to a single protocol, so splitting the flows into ICMP, TCP and UDP defines 3 smaller learning problems, minimizing confusion. Table II shows how the sample flows from week 2 can be split into 3 subproblems, where the most complex one (UDP) only has 6.79 million alert flows and 77.1 million no-alert flows.

TABLE II

| | Number of Flow in Millions Per Protocol For Week 2 | | |
|---|---|---|---|
| Protocol | Flag value | Alerts | No alert |
| ICMP | 1 | .383 | 88.5 |
| TCP | 6 | .348 | 55.3 |
| UDP | 17 | 6.79 | 77.1 |

Alerts of 75 different rules were triggered by the flow classifier 110 over the 4 week trace. The system 100 retained the 21 rules with the largest number of flows over weeks 1 and 2; the resulting rules are listed in Table III.

TABLE III

| | Number of Flows and Average Precision Per Rule: Baseline, Drift, and Sampling | | | | | | |
|---|---|---|---|---|---|---|---|
| | Number of Flows over weeks 1-2 | | Average Precision for WkA-B (week A = train, B = test) | | | | |
| | | | Baseline | | Drift | | Sampling |
| Alert Message | Total | Unique | Wk 1-2 | Wk 2-3 | Wk 1-3 | Wk 1-4 | Wk 1-2 | Wk 2-3 |
| | | | Header | | | | | |
| ICMP Dest. Unreachable Comm. Administratively Prohib. | 154570 | 12616 | 1.00 | 1.00 | 1.00 | 1.00 | 1.00 | 1.00 |
| ICMP Destination Unreachable Communication with Destination Host is Administratively Prohibited | 9404 | 3136 | 0.99 | 0.99 | 0.98 | 0.99 | 0.99 | 0.98 |
| ICMP Source Quench | 1367 | 496 | 1.00 | 1.00 | 1.00 | 1.00 | 1.00 | 1.00 |
| Average | | | 1.00 | 0.99 | 0.99 | 0.99 | 1.00 | 0.99 |

TABLE III-continued

Number of Flows and Average Precision Per Rule: Baseline, Drift, and Sampling

| Alert Message | Number of Flows over weeks 1-2 | | Average Precision for WkA-B (week A = train, B = test) | | | | | |
|---|---|---|---|---|---|---|---|---|
| | | | Baseline | | Drift | | Sampling | |
| | Total | Unique | Wk 1-2 | Wk 2-3 | Wk 1-3 | Wk 1-4 | Wk 1-2 | Wk 2-3 |
| Meta-information | | | | | | | | |
| ICMP webtrends scanner | 1746 | 5 | 1.00 | 0.99 | 0.99 | 0.99 | 0.90 | 0.99 |
| BAD-TRAFFIC data in TCP SYN packet | 2185 | 2145 | 1.00 | 1.00 | 1.00 | 0.99 | 1.00 | 1.00 |
| ICMP Large ICMP Packet | 24838 | 1428 | 1.00 | 1.00 | 1.00 | 1.00 | 1.00 | 1.00 |
| ICMP PING NMAP | 197862 | 794 | 1.00 | 1.00 | 1.00 | 1.00 | 0.61 | 1.00 |
| SCAN FIN | 9169 | 7155 | 0.99 | 1.00 | 1.00 | 0.86 | 0.99 | 1.00 |
| (spp stream4) STEALTH ACTIVITY (FIN scan) detection | 9183 | 7169 | 1.00 | 1.00 | 1.00 | 0.87 | 1.00 | 1.00 |
| average | | | 1.00 | 1.00 | 1.00 | 0.95 | 0.92 | 1.00 |
| Payload | | | | | | | | |
| MS-SQL version overflow attempt | 13M | 28809 | 1.00 | 1.00 | 1.00 | 1.00 | 1.00 | 1.00 |
| CHAT AIM receive message | 1581 | 1581 | 0.66 | 0.57 | 0.60 | 0.65 | 0.56 | 0.30 |
| EXPLOIT ISAKMP $1^{st}$ Payload length overflow attempt | 76155 | 65181 | 0.59 | 0.58 | 0.57 | 0.57 | 0.58 | 0.56 |
| ICMP PING CyberKit 2.2 Windows | 332263 | 299 | 1.00 | 1.00 | 1.00 | 1.00 | 1.00 | 1.00 |
| ICMP PING speedera | 46302 | 100 | 0.83 | 0.81 | 0.81 | 0.83 | 0.83 | 0.81 |
| (http inspect) NON-RFC HTTP DELIMITER | 13683 | 13653 | 0.41 | 0.54 | 0.57 | 0.30 | 0.37 | 0.50 |
| (http inspect) OVERSIZE REQUEST-URI DIRECTORY | 8811 | 8802 | 0.96 | 0.96 | 0.96 | 0.96 | 0.96 | 0.96 |
| (http inspect) BARE BYTE UNICODE ENCODING | 2426 | 2425 | 0.41 | 0.59 | 0.44 | 0.40 | 0.36 | 0.59 |
| (http inspect) DOUBLE DE-CODING ATTACK | 1447 | 1447 | 0.69 | 0.53 | 0.66 | 0.75 | 0.55 | 0.36 |
| (http inspect) APACHE WHITESPACE (TAB) | 1410 | 1409 | 0.47 | 0.60 | 0.53 | 0.59 | 0.40 | 0.59 |
| Average | | | 0.70 | 0.72 | 0.71 | 0.70 | 0.66 | 0.67 |
| (spp stream4) STEALTH ACTIVITY | 1800 | 1800 | 0.00 | 0.01 | 0.01 | 0.00 | 0.00 | 0.01 |
| (snort decoder) Truncated Tcp Options | 26495 | 25629 | 0.05 | 0.06 | 0.05 | 0.05 | 0.05 | 0.05 |

The second column reports the total number of flows associated with the rule over week 1 and 2, which range from 13 million to 1360 (note that most rules are evenly distributed over the 4 weeks). The third column reports the number of unique flows, which is representative of the complexity of a rule, being the number of positive examples used in training. The remaining columns are discussed below.

Detection Performance Criteria

Each rule is associated with a binary classifier by the ML trainer 108 that outputs the confidence with which the rule is detected on a given flow. A flow alert detection by the flow classifier 110 is a boolean action, however, and therefore requires that an operating threshold is associated with each classifier. Whenever the flow classifier 110 outputs a confidence above the operating threshold, an alarm is raised by flow classifier. It is customary in the machine learning literature to choose the operating threshold that minimizes the classification error, but this is not necessarily appropriate for the system 100. For example, a network operator may choose to accept a higher overall classification error in order to minimize the False Negative rate. More generally, the network operators are best equipped to determine the appropriate trade-off between the False Positive (FP) and True Positive (TP) rates. The Receiver Operating Characteristics (ROC) curve presents the full trade-off for binary classification problems by plotting the TP rate as a function of the FP rate. Each point on the ROC curve is the FP and TP values for a specific confidence (i.e., operating threshold) between 0 and 1. The ROC curve is useful for network operators because it provides the full trade-off between the FP and TP rates, but this also makes it a poor metric when evaluating a number of rules in a number of different settings. For purposes of the system 100, we require a single threshold-independent number that must account for a range of thresholds is desirable.

The most studied such measure is the Area Under the ROC Curve (AUC), but all our experiments return AUC values better than 0.9999. Besides the fact that such values make comparisons problematic, they are often meaningless. The Average Precision (AP), defined in equation (1) below, provides a pessimistic counterpart to the optimistic AUC. When setting the threshold at the value of positive example $x_k$, the numbers of total and false positives are: $TP_k = \Sigma_{i=1}^{n+}$ $1_{x_k \le x_i}$ and $FP_K = \sum_{j=1}^{n_-} 1_{x_k \le z_j}$, where i and j label the $n_+$ positive examples and $n_-$ negative examples $z_j$ respectively. The precision at threshold $x_k$ is the fraction of correctly detected examples $$\frac{TP_k}{TP_k + FP_k}$$

and its average over all positive examples is computed $$AP = \frac{1}{n_+} \sum_{k=1}^{n_+} \frac{TP_k}{TP_k + FP_k} \quad (1)$$

The AP reflects the negative examples which score above the positive examples, and, unlike the AUC, ignores the vast majority of negative examples whose scores are very low. A benefit of the AP metric is that it is more interpretable. For purposes of discussion, assume the ML trainer 108 runs Snort in a training mode until it detects a single alert, and then the ML trainer 108 sets up the detection threshold at the flow classifier 110 output for this alert. Assuming the alerts are I.I.D., an AP of p means that, for each true positive, one can expect $$\frac{1-p}{p}$$

false negatives.

Figure 3:
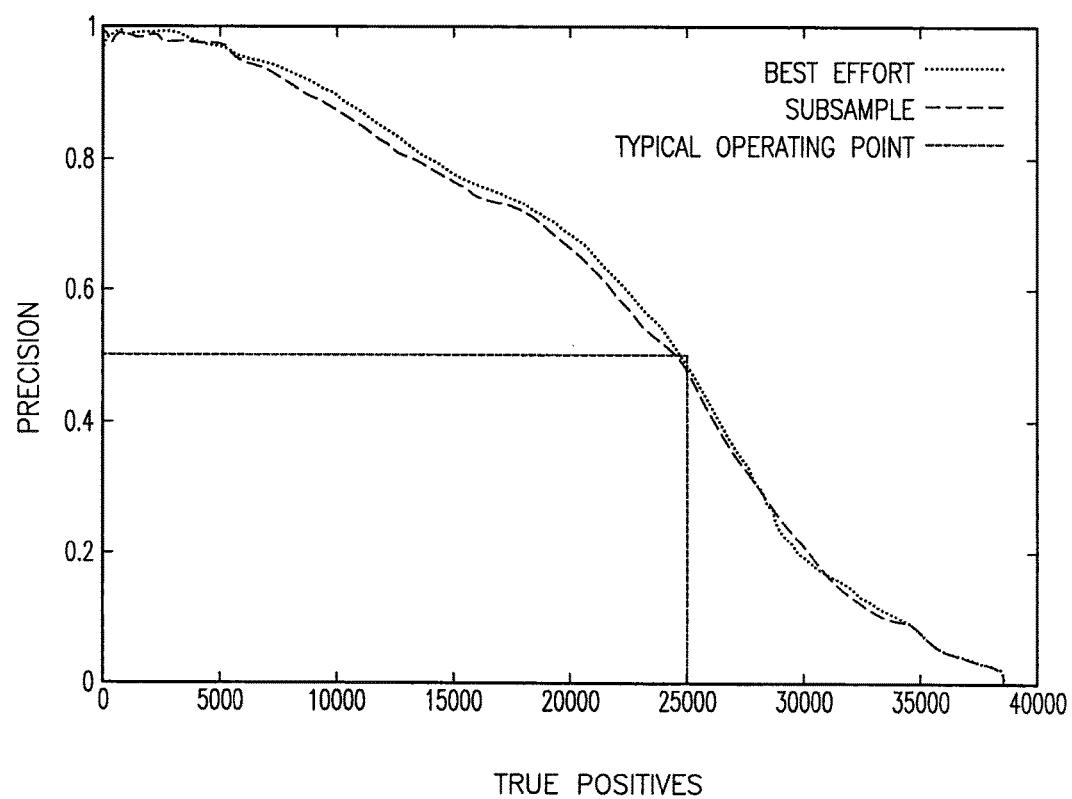
FIG. 3 is a chart illustrating the precision of operation of the detection system described in the present disclosure by plotting precision versus number of true positives for the EXPLOIT ISAKMP rule training on week one and testing on week 2.

An illustration of what AP means with an example drawn from the results is detailed in the next section. FIG. 3 plots the precision as a function of the number of TP for the EXPLOIT ISAKMP rule (see Table III). The AP corresponds to the area under this curve. It can be seen what a comparatively low AP of 0.58 for this rule means in terms of the operating curve. It is possible to alert on say 25,000 of the Snort events (about ⅔ of the total events for weeks 1-2, shown in the second column of Table III), while suffering the same number of false negatives (i.e., a precision of 0.5). In the next section it will be seen that the results can be far better for many other rules, with AP close to 1, leading to very small false positive rates. Moreover, it will be explained how a classifier with an AP of 0.5 can still be very useful to a network operator.

Experimental Results

Baseline Behavior

The average precisions in the flow classifier 110 are reported in Table III. The alerts are grouped according to the taxonomy presented above. For each category a simple macro-average is performed, where the AP for each rule is given equal weight, which is reported in the average row beneath each rule group. The baseline column in Table III reports the AP from training on one full week of data and testing on the subsequent week. Two such experiments are performed: the wk 1-2 column uses week 1 for training and week 2 for testing whereas the wk 2-3 column uses week 2 for training and week 3 for testing. For header and meta-information rules, the baseline results give an AP of at least 0.99 in all cases. Payload rules exhibit greater variability, ranging from about 0.4 up to over 0.99. The following analysis will illuminate the different properties of rules that lead to this variation in ML performance.

There were two payload rules that exhibited dramatically lower AP than the others; these are listed at the end of Table III and not included in the macro-average. A detailed examination of the underlying Snort rules showed these to be relatively complex and designed to alarm on a mixed variety of predicates. It is believed that the complexity of the Snort rules contributes to the difficulty in accurately characterizing them based on flow features.

Data Drift

The main information provided in Table III also illustrates the dependence of the AP as a function of the temporal separation between the training data and the test data. Measuring how performance drifts over time is critical, as it determines how often retraining should be applied. While the baseline described herein corresponds to a 1-week drift, wk 1-3 indicates a 2 week drift: it can either be compared to wk 1-2 (same training data, drifted test data) or wk 2-3 (drifted training data, same test data). In both cases, the difference from a 1-week drift to a 2-week drift is often lower than the difference between wk1-2 and wk2-3. This suggests that the impact of a 2-week drift is too low to be measurable. On the other hand, the loss in performance after a 3 week drift (wk 1-4) is often significant, in particular in the case of Payload and Meta-Information rules.

Sampling of Negative Examples

Because the number of negative examples far exceeds the number of positive training examples, (i.e., the vast majority of packets—and flows—do not raise any Snort alarms), it is anticipated that sampling to reduce the number of negative examples will have minimal impact on detection accuracy, but will drastically reduce the training time. In one embodiment, it is desirable to preferentially sample examples whose features are more common, or conversely, avoid the impact of noise from infrequently manifest features. For this reason the negative examples are grouped into sets with identical features, then Threshold Sampling M. Dudik, S. Phillips, and R. E. Schapire, "Performance Guarantees for Regularized Maximum Entropy Density Estimation," in *Proceedings of COLT'04*. Banff, Canada: Springer Verlag, 2004 is applied to each group as a whole. This involves selecting the group comprising c examples with probability min $\{1, c/z\}$ where z is chosen so as to sample a target proportion of the examples.

The results for a sampling rate of 1 in 100 negative examples are shown in the two columns labeled Sampling, rightmost in Table III. When comparing either the wk1-2 or the wk2-3 columns in the baseline and in the sampled case, there is a measurable loss in performance. This loss is small relative to fluctuations in performance from one week to another, however, which suggests that sampling negative training examples is an effective technique. In this example, sampling speeds up training by about a factor of 6. Without sampling, training a single rule takes, on average, 1 hour on a single Xeon 3.4 GHz processor, but can be reduced to 10 minutes with sampling.

Choosing an Operating Point

Choosing an appropriate operating threshold can be challenging. That is, above which confidence should the system 100 (see FIG. 1) trigger an ML alarm? The concept of precision, which is the proportion of ML alarms which are also Snort alarms, has been introduced. Another useful concept is the recall, which is the proportion of Snort alarms which are also ML alarms. A detector is perfect when both the precision and recall are 1, which, in the system 100, often happens for header and meta-information rules.

The story is more complicated for payload rules. The first two columns in Table IV, report the precision for thresholds chosen to obtain a recall of 1 and 0.99, respectively.

TABLE IV

Precision and Alarm Rate at High Recall for Payload Rules

| Alert Message | Precision for Recall of | | Alert % for Recall of | |
|---|---|---|---|---|
| | 1.00 | 0.99 | 1.00 | 0.99 |
| MS-SQL version overflow | 1.00 | 1.00 | 3.0 | 2.9 |
| CHAT AIM receive message | 0.02 | 0.11 | 0.0 | 0.0 |
| EXPLOIT ISAKMP first payload ICMP PING | 0.02 | 0.03 | 0.9 | 0.6 |
| CyberKit 2.2 Windows | 1.00 | 1.00 | 0.1 | 0.0 |
| ICMP PING speedera (http inspect) | 0.02 | 0.83 | 0.5 | 0.0 |
| NON-RFC HTTP DELIMITER | 0.00 | 0.01 | 1.3 | 0.6 |
| OVERSIZE REQUEST-URI DIR. | 0.01 | 0.20 | 0.1 | 0.0 |
| BARE BYTE UNICODE ENC. | 0.00 | 0.00 | 1.1 | 0.4 |
| DOUBLE DECODING ATTACK | 0.00 | 0.00 | 1.8 | 0.4 |
| APACHE WHITESPACE (TAB) | 0.00 | 0.00 | 1.1 | 0.1 |

As seen in Table IV, it is possible to get both high precision and recall only for the "MSSQL version overflow attempt" and "ICMP PING CyberKit 2.2 Windows" rules. For all the rules whose average precision is below 0.7, the precision falls to near 0.0 for high recall values. In cases where human post-processing is possible, high recall/low precision operating points can still be very useful, especially when the number of alarms is much lower than the total number of examples. As can be seen in the last two columns in Table IV, even rules with comparatively low AP scores only raise alarms for a small percentage of flows to guarantee a recall of 1.0 or 0.9. For instance, the "APACHE WHITESPACE" rule, with an average precision below 0.6, can deliver a 0.99 recall while alerting on only 0.1% of the flows. While human examination of false positives is not possible in typical applications, it is possible to run Snort on the ML alarms, at a fraction of the cost of running Snort on all flows.

Detailed Analysis of ML Operation

The taxonomy of Snort rules presented above that distinguishes rules according to the types of packet fields they access. "Payload rules" contain at least one predicate that inspects a packet's payload, "header rules" contain only predicates that can be exactly reproduced in a flow setting, and "meta rules" encompass all other Snort rules. Given enough training examples, a ML algorithm will be able to learn to perfectly classify flows according to header rules, whereas payload rules are generally much more challenging. As the results presented herein indicate, however, there are many meta rules that can be learned perfectly, and some payload rules as well.

It is necessary to delve deeper into the classifiers in order to understand the variability of detection accuracy within the payload and meta groups. Recall from a prior discussion that a trained classifier is a weighted sum over each predicate. Since each predicate operates on a single feature (e.g., TCP port, packet duration, or the like), this weight can provide intuition into the relative importance of this predicate to the classifier. For example, which of the destination port number or the flow duration is most important in order to correctly classify Slammer traffic? The standard way to measure the relative importance of each feature for a classifier is to measure the detection accuracy when the feature is removed. Thus, the system 100 trains the classifier using all features, but then removes the given feature from consideration during classification: if detection accuracy goes down then clearly this feature was important. Table V reports the results of doing precisely this: each column reports the AP when the feature for that column is ignored during classification.

Table V below demonstrates that Adaboost is able to correctly interpret (as opposed to merely mimic) many header rules by prioritizing the proper fields: the destination port, which encodes the ICMP code and type fields, is essential to each of the ICMP rules.

TABLE V

THE IMPORTANCE OF EACH FEATURE TO A CLASSIFIER AS MEASURED BY THE AP IF THE FEATURE IS REMOVED DURING DETECTION

| Rule | base line | dest port | src port | num byte | num pack | dura- tion | mean pack size | mean pack intval | TCP flag | IP serv type | Dest IP local |
|---|---|---|---|---|---|---|---|---|---|---|---|
| Header | | | | | | | | | | | |
| ICMP Dest Unreachable Comm. Admin. Prohib. | 1.00 | 0.00 | 1.00 | 1.00 | 1.00 | 1.00 | 1.00 | 1.00 | 1.00 | 1.00 | 1.00 |
| ICMP Destination Unreachable Comm. With Dest Host Administratively Prohib. | 0.99 | 0.00 | 0.99 | 0.99 | 0.99 | 0.99 | 0.99 | 0.99 | 0.99 | 0.99 | 0.99 |
| ICMP Source Quench | 1.00 | 0.00 | 1.00 | 1.00 | 1.00 | 1.00 | 1.00 | 1.00 | 1.00 | 1.00 | 0.61 |
| average | 1.00 | 0.00 | 1.00 | 1.00 | 1.00 | 0.99 | 0.99 | 1.00 | 1.00 | 1.00 | 0.87 |
| Meta-Information | | | | | | | | | | | |
| ICMP webtrends scanner | 0.99 | 0.89 | 0.99 | 0.00 | 0.99 | 0.99 | 0.75 | 0.99 | 0.99 | 0.99 | 0.59 |
| BAD-TRAFFIC data in TCP SYN packet | 1.00 | 0.74 | 1.00 | 1.00 | 1.00 | 1.00 | 0.99 | 1.00 | 0.50 | 1.00 | 1.00 |
| ICMP Large ICMP Packet | 1.00 | 1.00 | 1.00 | 1.00 | 1.00 | 1.00 | 0.43 | 1.00 | 1.00 | 1.00 | 0.96 |
| ICMP PING NMAP | 1.00 | 1.00 | 1.00 | 1.00 | 1.00 | 1.00 | 0.02 | 1.00 | 1.00 | 1.00 | 0.50 |
| SCAN FIN | 1.00 | 1.00 | 1.00 | 1.00 | 1.00 | 1.00 | 1.00 | 1.00 | 0.24 | 0.99 | 0.99 |
| average | 1.00 | 0.92 | 1.00 | 0.80 | 1.00 | 1.00 | 0.64 | 1.00 | 0.75 | 1.00 | 0.81 |
| Payload | | | | | | | | | | | |
| MS-SQL versionoverflow'attempt | 1.00 | 0.99 | 1.00 | 1.00 | 1.00 | 1.00 | 0.83 | 1.00 | 1.00 | 1.00 | 0.48 |
| CHAT AIM receive massage | 0.61 | 0.64 | 0.61 | 0.49 | 0.55 | 0.42 | 0.33 | 0.54 | 0.29 | 0.51 | 0.51 |
| EXPLOIT ISAKMP 1st payload lengthoverflow | 0.58 | 0.15 | 0.58 | 0.49 | 0.26 | 0.55 | 0.58 | 0.57 | 0.57 | 0.56 | 0.57 |
| ICMP PING CyberKit 2.2 Windows | 1.00 | 0.52 | 1.00 | 0.95 | 1.00 | 1.00 | 0.77 | 0.99 | 1.00 | 1.00 | 0.39 |
| IXMPPING speedera | 0.82 | 0.79 | 0.82 | 0.07 | 0.82 | 0.82 | 0.06 | 0.82 | 0.82 | 0.81 | 0.72 |
| (http inspect} NON-RFC HTTP DELIM | 0.48 | 0.02 | 0.34 | 0.15 | 0.47 | 0.24 | 0.22 | 0.32 | 0.22 | 0.42 | 0.42 |
| average | 0.75 | 0.52 | 0.72 | 0.52 | 0.68 | 0.67 | 0.46 | 0.71 | 0.65 | 0.72 | 0.52 |

Moreover, the meta rules that are learned well tend to inspect packet-header fields that are reported inexactly in flows (e.g., packet payload size or TCP flags). The "SCAN FIN" rule is raised by Snort when only the FIN flag is set in a TCP packet. When the exact classifier generated by Adaboost (i.e., this includes the chosen thresholds) for this rule was inspected, it was found that Adaboost learns to raise this alarm whenever the aggregated TCP flags field in the flow header has a set FIN flag either by itself, combined with SYN, or combined with SYN and RST. As expected, no alarm is raised if the flow TCP flag field has FIN and ACK set.

Predicates that require access to packet payload information, on the other hand, cannot be reproduced in a flow setting whatsoever. For payload rules to be learned in a flow setting, therefore, the corresponding flow classifier must rely on some combination of (A) other predicates of the original Snort rule, and/or (B) entirely new predicates constructed by the ML algorithm to describe the packets/flows matching these rules. Table V contains several instances of each, and the present disclosure further investigates two examples (viz. "ICMP PING CyberKit 2.2 Windows" and "MS-SQL version overflow attempt") by inspecting the precise classifier generated by Adaboost.

The MS-SQL rule has several predicates, including one that matches a specific destination port number, one that inspects the size of the packet payload, and one that looks for a string pattern in the payload itself. Adaboost learns the first predicate exactly, but learns a mean packet size predicate that is more precise than the Snort equivalent. That is, whereas Snort requires that the packet payload size must be greater than 100 bytes, Adaboost requires that the mean packet size should be 404 bytes, which in fact is the exact length of a SQL Slammer packet. Indeed, the corresponding rule has been used in some cases to help identify Slammer traffic Moore, V. Paxson, S. Savage, C. Shannon, S. Staniford, and N. Weaver, "Inside the slammer worm," *IEEE Security and Privacy*, vol. 1, no. 4, pp. 33-39, 2003. Combining this predicate and the destination port number, Adaboost learns this rule with high accuracy.

CyberKit is another payload rule that is learned by Adaboost with a high degree of accuracy. Table V shows that the important features for this classifier are (a) the destination port number, (b) the mean packet size, and (c) whether or not the target host is part of the configured local domain ("dest IP local"). The first and last of these features are a part of the Snort specification, but the mean packet size predicate is not. Adaboost results indicate that flows that trigger this Snort alarm have a mean packet size between 92 and 100 bytes per packet.

The ability of ML algorithms to generate predicates independent of the original Snort specification is why ML algorithms of the system 100 provide a significant advantage over more rudimentary techniques. For example, a technique that identifies and translates only the flow and meta predicates from Snort rules (i.e., those predicates that can be translated either exactly or approximately) would perform worse in the case of MS-SQL. While such simpler techniques would perform equally well for header rules, they would be ineffective for the majority of payload rules where only a ML approach has a chance to perform well.

The scaling properties of computation required in the architecture illustrated in FIG. 1 may now be addressed. Consider the ML certain aspects that require further study. The present discussion used a single dataset for learning and testing. However, the architecture of the system 100 requires that flow-level rules generated by ML on data gathered at a small number of sites can accurately alarm on flows measured at other sites. A study of multiple datasets gathered from different locations, training and testing on different datasets can determine whether differences in the distribution of flow features such as duration, due, for example, to different TCP dynamics across links of different speeds, could impair the accuracy of cross-site alarming. An increase in packet sampling sites may be necessary to achieve an adequate sample size. One skilled in the art can investigate the effect on detection accuracy if using packet sampled flow records for learning and classification.

Computational Efficiency

The computational speed includes an analysis of the three phases of our scheme: (i) correlation of flow records with Snort alarms prior to training; (ii) the ML phase; (iii) run-time classification of flows based on the learned flow rules. We combine analysis with experimental results to estimate the resources required for the architecture of the system 100 (see FIG. 1). Consider two scenarios.

A: Scaling the Interface Rate:

what resources are needed to perform correlation and ML at a higher data rate? In this analysis, consider traffic equivalent to a full OC48 link (corresponding to a large ISP customer or data center). At 2.5 Gbits/sec this is a scale factor 150 larger than the test dataset used in the initial experiment; it is assumed the numbers of positive and negative examples scale by the same factor.

B: Scaling Classification Across Sites:

Consider a set of network interfaces presenting traffic at rate of the data set previously described; at 2 MB/sec this represents medium sized ISP customers. The flow rules are learned from traffic on one of the interfaces. What resources are required to classify flows on the others?

A. Costs, Implementations, and Parallel Computation

The cost of parallelization of correlation and learning steps is reasonable, since the cost is borne only once per learning site, compared with the cost deploying Snort to monitor at multiple locations at line rate. Parallelism for the classification step is more costly, since its scale the resources required for at monitoring point. The implementations used here are not optimized, so the numerical values obtained are conservative.

B. Initial Correlation of Flow and Snort Data

The system 100 can correlate flow records with Snort alarms at a rate of 275 k flows per second on a 1.5 GHz Itanium 2 machine: about 15 minutes to correlate one week's data. Under the scaling scenario A above, the hypothetical OC48 would require about 33 hours of computation on the same single processor to correlate one week's data. This task is readily parallelized, the cost borne once prior to the learning stage.

C. Learning Step

The time taken for Adaboost or the Maxent algorithm discussed above M. Dudik, S. Phillips, and R. E. Schapire, "Performance Guarantees for Regularized Maximum Entropy Density Estimation," in *Proceedings of COLT'04*. Banff, Canada: Springer Verlag, 2004 to learn a given rule is proportional to the product of three quantities:

the number of iterations $N_i$, which is fixed to the conservatively large number of 200 for purposes of analysis.

the total number of + examples, both positive and negative $N_e = n_- + n_+$ the number of candidate weak classifiers $N_c$ that Adaboost must consider.

For numerical features, the number of weak classifiers is the number of boundaries that separate runs of feature values from positive and negative examples when laid out on the real line. This is bounded above by twice the number $n_+$ of positive examples. The system 100 described above computed the dependence of $N_c$ on data size for sampled subsets of the dataset; per rule, $N_c$ scaled as $n_+^a$ for some $\alpha<1$.

These behaviors suggest the following strategy to control computation costs for processing traffic while maintaining learning accuracy:

Use all positive examples;

Use at most fixed number $n\_^\circ$ of negative examples.

Limiting the number of negative examples does not impair accuracy since there are still more positive examples. Computation time is proportional to $N_i N_e$ $N_c \le 2 N_i n_+ (n_+ + n\_^\circ)$. While $n_+$ is much less than $n\_^\circ$—see Table I—computation time scales roughly linearly with the underlying data rate.

To see how this plays out in this hypothetical example, consider a dataset with 1 in 10 sampling of positive examples as representing the reference operating threshold. Hence, from Table I, there are roughly $n\_^\circ=4M$ unique negative examples. For $n_+$ the system 100 takes the average number of unique positive examples per rule per week, namely 8861, the average of the second numerical column in Table III. Scaling to OC48 scales $n_+ \to 150 n_+$ and hence $n_+(n_+ + n\_^\circ) \to 150 n_+(150 n_+ + n\_^\circ)$. Learning time increases by roughly a factor 200, lengthening the average computation time per rule from 10 minutes to 33 hours. Although this may seem large, it is conservative and likely unproblematic, since (i) it is far shorter that the data drift timescale of two weeks which should not depend on link speed, and can be reduced by (ii) optimized implementation; (iii) parallelization, once per learning site; and (iv) sampling the positive examples. Sampling may be desirable to control training time for rules with many positive examples, being precisely the rules for which sampling has the least impact on accuracy.

D. Classification Step

The number of predicates selected by Adaboost is typically around 100: the number of feature lookups and multiply-adds needed to test a rule. The same machine as above is able to apply these predicates (i.e., perform flow classification), at a rate of 57 k flows/second. The original dataset presented herein flows at a rate of about 530 flows/second, so this could nearly accommodate the 150 fold increase in flow rate in Scenario A, or classify flows from 100 interfaces in Scenario B.

CONCLUSIONS

The proposed ML approach to reproducing packet level alerts for anomaly detection at the flow level; Applying Snort rules to a single 4 week packet header trace, it is found that:

Classification of flow-level rules according to whether they act on packet header, payload or meta-information is a good qualitative predictor of average precision.

The ML approach is effective at discovering associations between flow and packet level features of anomalies and exploiting them for flow level alerting.

Drift was largely absent at a timescale of two weeks, far longer than the few minutes required for learning.

The proposed architecture of system 100 is designed to exploit this at network scale, and set out the steps for a proof of concept. The computation complexity of this approach is analyzed and it can be argued that computation remains feasible at network scale. Although the present disclosure focused on single packet alarms produced by Snort, the approach described herein could in principle be applied to learn from flow records alone, alarms generated by multipacket/flow events of the type monitored by Bro N. Duffield, C. Lund, and M. Thorup, "Charging from sampled network usage," in Proc. 1st ACM SIGCOMM Internet Measurement Workshop (IMW), 2001, pp. 245-256.

A number of references related to anomaly detection have been cited herein. Each of these references is incorporated herein by reference in its entirety.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A system comprising:
a processor; and
memory comprising instructions that, when executed by the processor, cause the processor to perform operations comprising:
receiving a flow record of a data flow,
receiving a packet alert generated for a data packet, the packet alert generated based on a packet-level rule,
determining a time when the packet alert associated with the data packet was generated,
determining that the time when the packet alert associated with the data packet was generated occurred between a start time and an end time of the data flow,
in response to determining that the time when the packet alert associated with the data packet was generated occurred between the start time and the end time of the data flow, associating the packet alert with the data flow,
attributing, to the packet-level rule, a score in a form of a weighted sum $\Sigma_k w_k p_k(x)$ over flow level predicates $p_k(x)$, and
in response to the score exceeding a threshold, constructing a flow-level rule that, when applied to the data flow, generates an alarm associated with the data flow, wherein the flow-level rule identifies an anomaly in the data flow, and wherein a weight $w_k$ is chosen to minimize a classification error such that the flow-level rule, when applied to the data flow, generates the alarm associated with the data flow when the packet-level rule, when applied to the data packet, generates the packet alert for the data packet.

2. A method comprising:
receiving, by a system comprising a processor, a flow record of a data flow;
receiving, by the system, a packet alert generated for a data packet, the packet alert generated based on a packet-level rule,
determining, by the system, a time when the packet alert associated with the data packet was generated;
determining, by the system, that the time when the packet alert associated with the data packet was generated occurred between a start time and an end time of the data flow;
in response to determining that the time when the packet alert associated with the data packet was generated occurred between the start time and the end time of the data flow, associating, by the system, the packet alert with the data flow;
attributing, to the packet-level rule by the system, a score in a form of a weighted sum $\Sigma_k w_k p_k(x)$ over flow level predicates $p_k(x)$; and
in response to the score exceeding a threshold, constructing, by the system, a flow-level rule that, when applied to the data flow, generates an alarm associated with the data flow, wherein the flow-level rule identifies an anomaly in the data flow, and wherein a weight $w_k$ is chosen to minimize a classification error such that the flow-level rule, when applied to the data flow, generates the alarm associated with the data flow when the packet-level rule, when applied to the data packet, generates the packet alert for the data packet.

3. A memory storing instructions that, when executed by a processor of a system, cause the processor to perform operations comprising:
receiving a flow record of a data flow;
receiving a packet alert generated for a data packet, the packet alert generated based on a packet-level rule;
determining a time when the packet alert associated with the data packet was generated;
determining that the time when the packet alert associated with the data packet was generated occurred between a start time and an end time of the data flow;
in response to determining that the time when the packet alert associated with the data packet was generated occurred between the start time and the end time of the data flow, associating the packet alert with the data flow;
attributing, to the packet-level rule, a score in a form of a weighted sum $\Sigma_k w_k p_k(x)$ over flow level predicates $p_k(x)$; and
in response to the score exceeding a threshold, constructing a flow-level rule that, when applied to the data flow, generates an alarm associated with the data flow, wherein the flow-level rule identifies an anomaly in the data flow, and wherein a weight $w_k$ is chosen to minimize a classification error such that the flow-level rule, when applied to the data flow, generates the alarm associated with the data flow when the packet-level rule, when applied to the data packet, generates the packet alert for the data packet.

* * * * *